March 3, 1942. D. DOS REIS 2,275,057
APPARATUS FOR BABBITTING OR LINING BEARING SHELLS
Filed Aug. 26, 1939
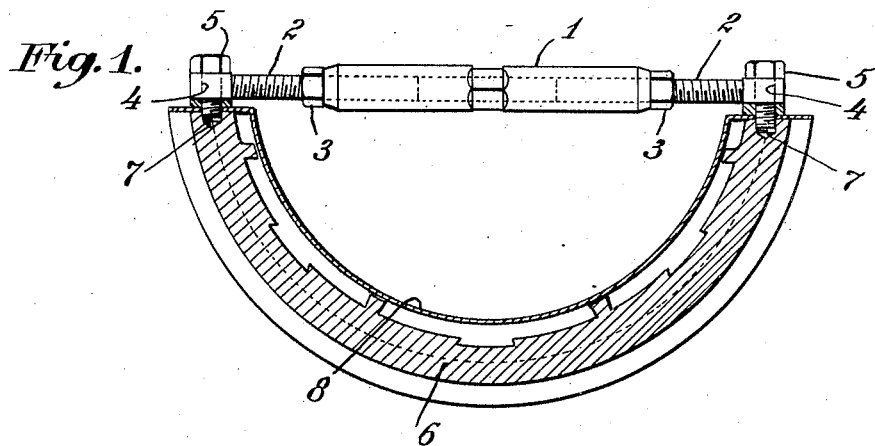
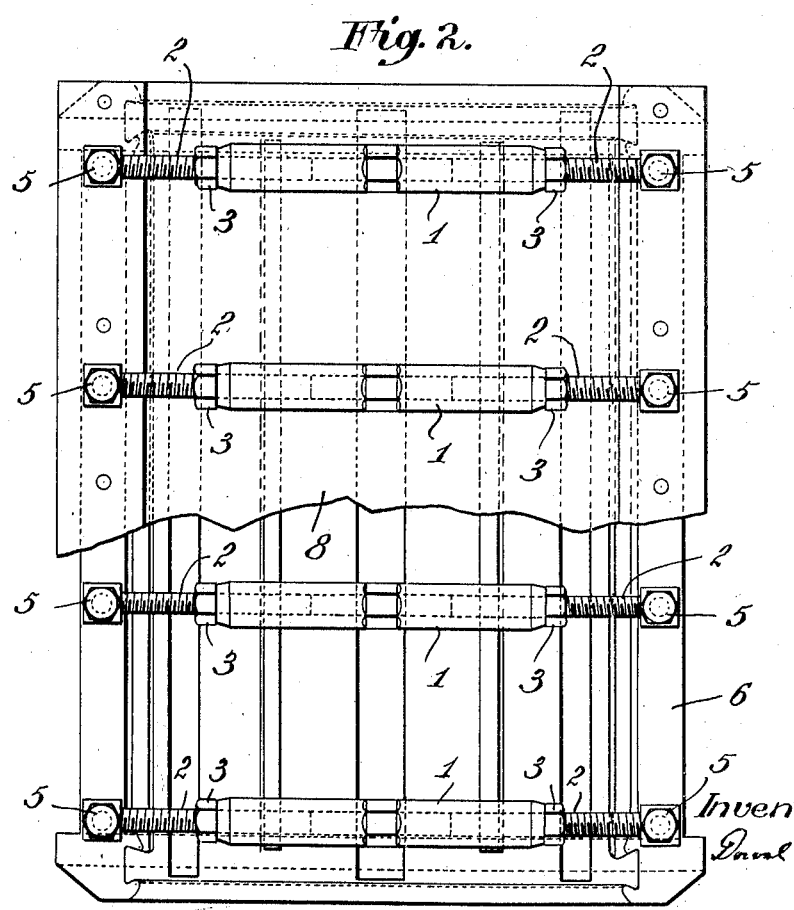

Patented Mar. 3, 1942

2,275,057

UNITED STATES PATENT OFFICE 2,275,057

APPARATUS FOR BABBITTING OR LINING BEARING SHELLS

Dorval dos Reis, Rio de Janeiro, Brazil

Application August 26, 1939, Serial No. 292,032

1 Claim. (Cl. 22—203)

The present invention relates to improvements in apparatus for babbitting or lining of bearing shells which is particularly designed to improve the process of babbitting bearing shells by preventing distortion and running out of the Babbitt metal and by causing the Babbitt metal to anchor much better than heretofore.

In large machine shops, notably in shipyards where large bearing shells are made and repaired for marine machinery or other types of engines, at the conclusion of the operation the bearing shells are found to be out of round and sometimes useless due to distortion of the shell, resulting from the heat operations involved in the lining process.

This trouble in many cases makes the bearing shell unsuitable for the purpose for which it was prepared, because it can not fit in the right position on its seat. This often causes great trouble when the bearing shells have large dimensions due to the fact that in some cases the deformation may reach a relatively large amount due to the small thickness of the shell as compared with its other dimension.

In such cases the distortion can not be corrected so easily by the methods at present used in the shops, and even if it can be corrected the Babbitt metal will be sacrificed, because in general it fails to anchor to the shell. It has a tendency to loosen the crack when in service. In general the particular make of babbitt is blamed, but the trouble certainly resides in the procedure heretofore used in lining the shells.

The aim of the present invention is to avoid the change of shape of the bearing shell by preventing distortion and keeping the shell always in the right shape making perfect adaptability of the shell to its seat in the machine. Practically no clearance will be found between the outside of the shell and the inner side of the seat because the shell will keep a perfect roundness after the babbitting operation is completed and the apparatus hereinafter described is removed. Also the journal and the inside surface of the bearing shell will adjust perfectly, allowing in this way a uniform clearance for the lubricating oil film.

In accordance with my invention I join the sides of the bearing shell by means of specially designed struts which are secured to the bearing shell sides by means of bolts. These struts comprise a turnbuckle which can be adjusted to the desired right position by turning the turnbuckle, thereby placing the bearing shell in the desired right gauge. For this purpose, convenient bolt holes are made along the longitudinal edges of the bearing shell.

The invention is illustrated in the accompanying drawing in which:

Figure 1 is a transverse section of a bearing shell showing one of the struts secured thereto, and Figure 2 is a plan view of the bearing shell and strut assembly of which Figure 1 represents a transverse section.

Referring to the drawing, each of the above-mentioned struts comprises a turnbuckle 1 having a pair of oppositely screw-threaded tie rods 2, and a pair of lock nuts 3. Each of the tie rods 2 has an eye 4 at its outer end to receive a bolt 5. In order to secure the strut to the bearing shell 6 the bolts 5 are passed through the eyes 4 and threaded into openings or apertures 7 in the bearing shell. A plurality of these openings 7 may be provided along each longitudinal edge of the bearing shell.

As shown in Figure 2, a number of struts may be secured to the bearing shell in the manner just described. Each strut is accurately adjusted by turning the turnbuckle 1 until the eyes 4 register accurately with the openings 7 in the bearing shell. The lock nuts 3 are then tightened to lock the parts of the strut in their adjusted position. The bolts 5 snugly engage the eyes 4 and the apertures 7 so that there is no play to allow either inward or outward movement of the edge portions of the bearing shell.

By securing the struts to the bearing shell as above described, the bearing shell is kept in the right shape, and remains in the same shape, at least practically, during all the babbitting process.

The bearing shell once braced by the struts and heated for tinning or receiving the molten metal does not substantially change its shape and no distortion at all is found after the complete lining operation is finished and the struts removed. That has been proven by gauging upon completion of re-metalling.

A mandrel 8 may be provided with convenient holes and secured to the walls of the shell by the same bolts that secure the struts to the shell, as shown in the drawing.

I claim:

The combination with a bearing shell having a plurality of apertures along the longitudinal edges thereof, of means for immobilizing the sides of said shell during the lining operation, said means comprising a plurality of rigid, adjustable struts firmly connected to opposite sides of said shell whereby the distance between the sides of said shell will be constant and distortion avoided irrespective of expansion or contraction of the lining metal said struts comprising a turnbuckle having oppositely screw-threaded tie rods, said tie rods having eyes registering accurately with said apertures and bolts snugly engaging said eyes and said apertures.

DORVAL DOS REIS.